United States Patent [19]
Yeh

[11] Patent Number: 5,538,631
[45] Date of Patent: Jul. 23, 1996

[54] METHOD AND APPARATUS FOR DISSOLVED AIR FLOTATION AND RELATED WASTE WATER TREATMENTS

[76] Inventor: George C. Yeh, 2 Smedley Dr., Newtown Square, Pa. 19073

[21] Appl. No.: 399,057

[22] Filed: Mar. 8, 1995

[51] Int. Cl.⁶ ............................................. C02F 1/24
[52] U.S. Cl. ............... 210/221.2; 210/109; 210/195.1; 210/320; 210/521; 210/703
[58] Field of Search ............... 210/221.2, 221.1, 210/521, 522, 109, 195.1, 320, 322, 294, 703

[56] References Cited

U.S. PATENT DOCUMENTS

| | | |
|---|---|---|
| 2,920,763 | 1/1960 | Lind . |
| 3,063,938 | 11/1962 | Katz . |
| 3,175,687 | 3/1965 | Jones . |
| 3,182,799 | 5/1965 | Krofta . |
| 3,666,112 | 5/1972 | Pielkenrood . |
| 3,754,656 | 8/1973 | Horiguchi . |
| 3,797,668 | 3/1974 | Pielkenrood . |
| 3,831,758 | 8/1974 | Watson . |
| 4,216,085 | 8/1980 | Chittenden . |
| 4,257,891 | 3/1981 | Albohn . |
| 4,274,959 | 6/1981 | Roediger . |
| 4,470,903 | 9/1984 | Van Leeuwen . |
| 4,957,628 | 9/1990 | Schulz . |
| 4,957,633 | 9/1990 | Suutarinen . |
| 5,028,333 | 7/1991 | Wright . |
| 5,130,029 | 7/1992 | Suutarinen . |
| 5,268,099 | 12/1993 | Krofta . |
| 5,391,306 | 2/1995 | Meurer . |

FOREIGN PATENT DOCUMENTS

| | | |
|---|---|---|
| 618454 | 8/1991 | Australia . |
| 54-146457 | 11/1979 | Japan . |
| 1477688 | 5/1989 | U.S.S.R. . |
| 1555293 | 4/1990 | U.S.S.R. . |
| 1710514 | 2/1992 | U.S.S.R. . |
| 94/17920 | 8/1994 | WIPO . |

*Primary Examiner*—Thomas M. Lithgow
*Attorney, Agent, or Firm*—Howson and Howson

[57] ABSTRACT

A dissolved air flotation (DAF) system and method for gas-liquid contacting operations. A mixture of untreated liquid and liquid saturated with dissolved air is passed through a series of upward deflecting screens placed across the flowpath in a rectangular tank. Microbubbles of air released from the mixture produce a buoyant force which carries contacted particles to the surface. Floated particles released from the microbubbles form a sludge which is supported above the surface of the mixture by a layer of air derived from the microbubbles. A top layer of the sludge is skimmed off according to a predetermined residence time of sludge at the surface. Liquid containing dissolved air is also introduced downstream of each deflecting screen to enhance flotation and clarification.

28 Claims, 2 Drawing Sheets

5,538,631

METHOD AND APPARATUS FOR DISSOLVED AIR FLOTATION AND RELATED WASTE WATER TREATMENTS

BACKGROUND OF THE INVENTION

1. Field of the Invention

This invention relates generally to treatment of waste liquids; and more particularly to a new and improved method and apparatus for treating waste water and other liquids utilizing dissolved air flotation and related technologies.

2. Description of the Prior Art

Conventional methods of treating waste water and similar liquids is usually carried out in several stages. Easily settled solids are separated from a liquid medium by sedimentation, and suspended solids and emulsified matter are removed by unassisted flotation or dissolved air flotation (DAF). Remaining dissolved matters may be converted chemically to precipitates, or biologically to microorganisms, for separation from the liquid medium. Sometimes dissolved matters are removed by mass transfer operations, such as adsorption, desorption, stripping, extraction, crystallization, membrane separation, etc. The solids separated by these treatments is usually dewatered before incineration or by other disposal means.

The equipment employed in each stage of treatment requires considerable capital investment and plant space, especially if the treatment involves aerobic or anerobic biotreatments of dissolved organics or oxidative digestion of microorganisms. Such treatments are not possible where there is limited capital and space.

Most of these systems are also unacceptable economically and environmentally. They are relatively inefficient because of their low conversion rates, due mainly to turbulence and back-mixing in the liquid flowpath, especially at high flow rates. The pervasiveness of the turbulence and back-mixing is discussed in more detail in U.S. Pat. No. 5,382,358 to George C. Yeh entitled "Apparatus for Dissolved Air Flotation and Similar Gas-Liquid Contacting Operations."

Conventional DAF systems typically place baffles inside a flotation tank in front of the incoming liquid medium to direct floc-bubble agglomerates formed therein toward the surface. In an upright cylindrical tank configuration, the baffle is generally placed concentrically and upright in the tank. In a rectangular tank configuration, such as disclosed in U.S. Pat. No. 3,175,687 to W. H. Jones, the baffle is flat and placed generally upright. The turbulence, recirculation and back-mixing produced by the baffles more than offsets the beneficial effect of directing the agglomerates to the surface, especially at high flow rates or sudden surges in flow. Consequently, the liquid loading capacity is limited, and clarification efficiency degraded because the incoming liquid continues to flow freely under turbulent conditions after passing the baffles. While such baffles in both cylindrical and rectangular flotation tanks help to direct floc-bubble agglomerates toward the surface of the liquid medium, their total effect is detrimental to DAF systems.

The effects of turbulence and back-mixing can be reduced by increasing the length of the liquid flowpath over which flotation occurs, such as by a long rectangular tank with liquid inlet and outlet ports at either end, but space, especially if indoors, is insufficient to accommodate such a long tank. Another tank designed for smaller areas utilizes a short rectangular tank divided lengthwise into a connecting series of labyrinthine-like compartments through which the liquid flows in a winding path. However, the turbulence created at the junctions of these compartments, and the restrictions in the number of compartments possible, limit the beneficial effects.

U.S. Pat. No. 5,382,358 supra discloses a unique design in which an upright cylindrical flotation tank includes at least one partition curved forming a long involute or evolute flow channel. A mixture of untreated liquid and recycled liquid saturated with dissolved air under pressure is continuously introduced at a controlled rate at one end of the channel and flows through the channel under near plug-flow conditions. Micro-bubbles of air released from the mixture rise through the liquid mixture providing a buoyant force which carries any contacted particles of suspended matter to the surface. A sludge is formed and the top layer of which is continuously skimmed off at a rate regulated to maintain a predetermined residence time and solid content. Centrifugal and gravitational forces in the flowpath cause large or heavy solids to separate and settle in the bottom of the tank where they may be drawn off. Commercial units constructed according to the patent have achieved unusually high clarification efficiencies, viz. at or near 100% by weight, and solid contents in the sludge between 50% and 85% by weight depending on the sludge residence time on the surface.

The involute or evolute flotation tank configuration is also applicable to gas-liquid contacting processes, mass transfer processes between gases and liquids, chemical and biological gas-liquid reactions, and for two or more of these processes carried out simultaneously. No other DAF systems are known to be capable of carrying out multiple processes simultaneously.

While the involute or evolute configuration tank has proven a significant improvement in the state of the art, there remain new DAF facilities where rectangular flotation tanks are more suitable because of lower initial costs, anticipated loadings, nature of the liquid medium, etc. There are also many existing DAF facilities having rectangular flotation tanks in need of upgrading for more efficient operations.

SUMMARY OF THE INVENTION

It is therefore an object of the present invention to provide a novel and improved DAF system which utilizes a rectangular flotation tank configuration for treating waste water and other liquids, which yield high clarification efficiencies and high solid contents in the floated sludge.

Another object is to provide an improved DAF method and apparatus utilizing a rectangular tank configuration for gas-liquid contacting processes and chemical and/or biological gas-liquid reactions.

A still further object of the invention is to provide an improved rectangular flotation tank for a DAF liquid treatment process capable of simultaneously clarifying treated liquid, thickening floated sludge and reacting the liquid with a gas.

Still another object of the invention is to provide an improved DAF method utilizing a rectangular flotation tank configuration for achieving high clarification efficiencies at very high liquid loading rates in a short flowpath.

Briefly, these and other objects are achieved in a DAF system comprising an upright rectangular flotation tank in which a mixture of untreated liquid and liquid saturated with dissolved air under pressure is introduced at one end of the tank and treated liquid is discharged at the other end of the tank near the bottom. A series of deflector screens placed across the flowpath at spaced intervals direct the liquid mixture slightly upward to produce vertically uniform near-laminar flow with little or no turbulence. The distance between adjacent screens is usually determined by the height of the liquid level and the average linear velocity of the liquid flowing through the tank. The flow is divided into several parallel channels to insure more uniform near-laminar flow. Microbubbles of air released from the liquid mixture flowing through the tank produce a buoyant force sufficient to carry any contacted particles of suspended matter to the surface.

The near-laminar flow of the liquid produces a sliding action between particles contained in adjacent layers which aids in hydraulic flocculation of the particles. Under steady state conditions a steep clarification gradient is thereby established vertically and horizontally along the flowpath with least concentration of particles at the discharge end of the tank near the bottom. The deflector screens help prevent non-ideal flows, such as circulation, short-circuiting, by-passing, back-mixing, etc. which commonly occur in the prior art rectangular tank DAF systems. Such non-ideal flows must be absent to produce stable particle-microbubble attachment and plug-like flow in the tank for high clarification efficiencies and/or conversion.

The liquid height and residence time of the floated matter is regulated to form a bed of the sludge supported by a blanket of the rising bubbles above the liquid surface. As the sludge bed thickens, the region near the top becomes drier and is removed by a slow-moving skimmer at a rate equal to the flotation rate in order to maintain the sludge bed thickness.

BRIEF DESCRIPTION OF THE DRAWINGS

For a better understanding of the objects and principles of the invention, reference will be made to the following detailed description taken in conjunction with the accompanying drawings wherein.

DESCRIPTION OF THE PREFERRED EMBODIMENT

Figure 1:
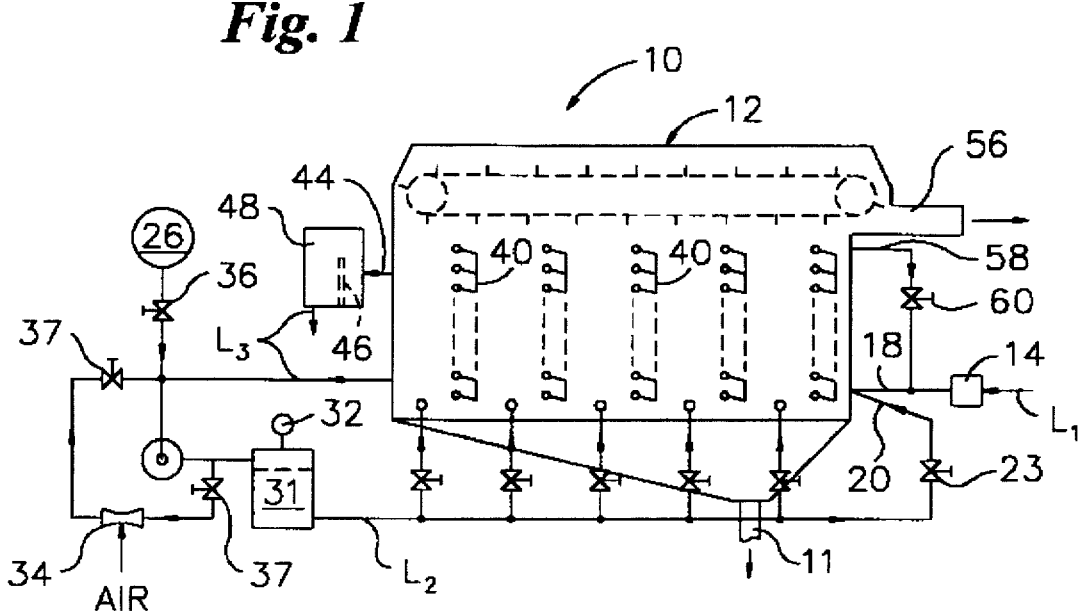
FIG. 1 is a schematic block diagram of a preferred embodiment of a DAF system according to the invention utilizing a multichannel rectangular flotation tank.
Figure 2:
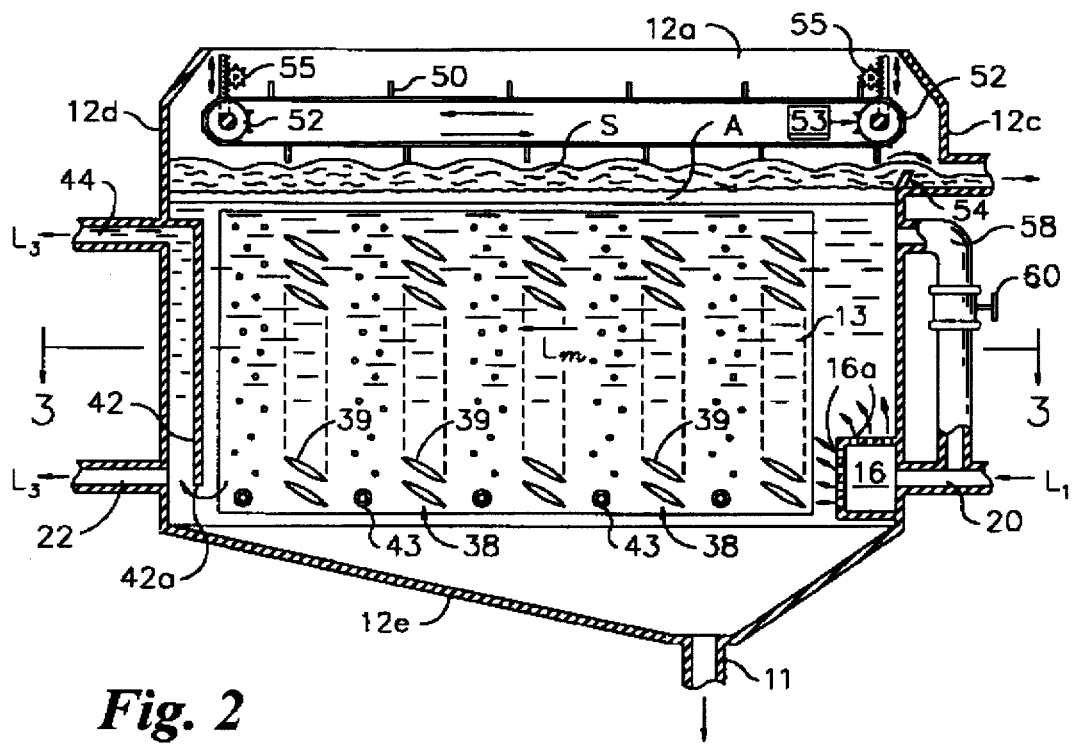
FIG. 2 represents an elevation view in longitudinal cross section of the flotation tank of FIG. 1.
Figure 3:
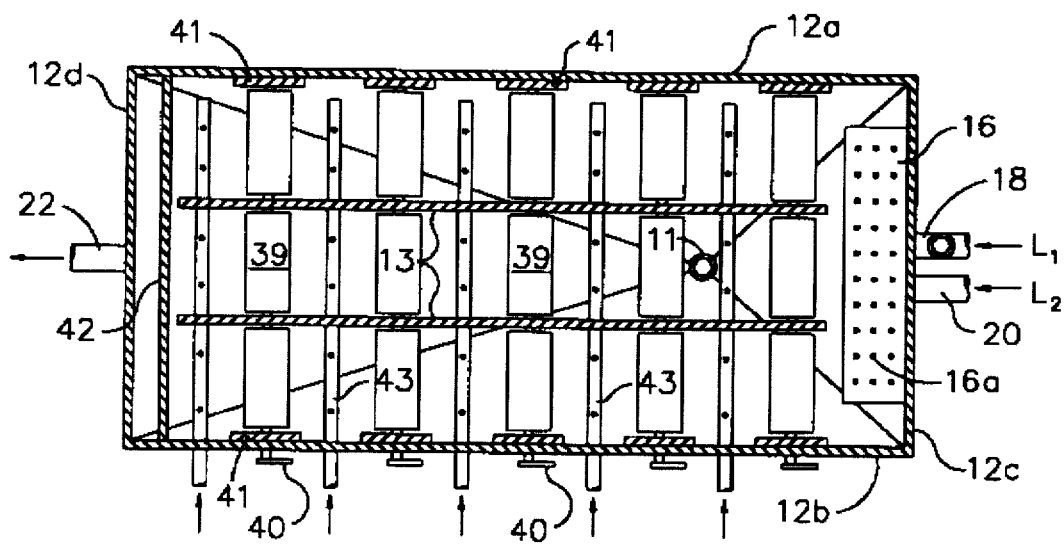
FIG. 3 represents a plan view in longitudinal cross section of the flotation tank taken along the line 3—3 of FIG. 2.

Referring now to the drawings wherein like referenced characters and numerals designate like or corresponding parts throughout the several views, there is shown in FIG. 1 a DAF system, indicated generally by the numeral 10, with an open-top flotation tank 12 for treating a liquid $L_m$ according to the invention. As shown in more detail in FIGS. 2 and 3, the configuration of tank 12 is generally rectangular with upright side walls 12a and 12b, end walls 12c and 12d, and a bottom hopper 12e which slopes downward to a drain 11 for collecting and discharging sediment. Parallel flow channels are formed by vertical partitions 13 extending substantially the full length of tank 12 without touching bottom 12e or extending above the height of the level of a mixed liquid $L_m$. In tank 12 the partitions provide narrow channels for reducing lateral migration of the flowpath as well as maintaining more uniform near-laminar flow. Partitions 13, of course, may be omitted where the width of the tank is narrow and/or flow rates are low.

Influent or untreated liquid $L_1$ passes through an orifice 14 and enters a mixing chamber 16 through an inlet port 18 at the bottom of tank 12 where it is mixed with a treated and recirculated liquid $L_2$ containing dissolved air which enters chamber 16 through an inlet port 20 laterally adjacent to port 18. Recirculated liquid $L_2$ is derived from a portion of clarified mixed liquid $L_3$ discharged from an outlet port 22 at the bottom of tank 12 at rate controlled by a valve 23. Compressed air from a supply 26 is contacted and dissolved in liquid $L_3$ as it is delivered under high pressure through a pump 30 and a dissolution and separation tank 31 to inlet port 20. For anaerobic treatments, nitrogen may be supplied to the tank instead of air. A pressure relief valve 32 at the top of tank 31 allows any undissolved gas to escape.

An alternative or back-up system for dissolving air in recirculated liquid $L_2$ includes an air injector 34 through which the liquid $L_3$ is circulated by pump 30. As shown, either arrangement may be used as a back-up for the other. For example injector 34 operates by closing shut-off valve 36 at the outlet of compressed air supply 26 and opening shut-off valves 37 at the inlet and outlet of air injector 34. By regulating the air injection rate, the formation of undissolved air can be prevented.

The mixture of liquids $L_1$ and $L_2$ forms liquid $L_m$ which flows into tank 12 under turbulent conditions through a plurality of holes 16a in chamber 16 with a large portion forming floc-bubble agglomerates in liquid $L_m$ which quickly rise to the surface. The remainder flows through a series of deflector screens or baffles 38 placed across the channels at spaced intervals along the flowpath.

Each baffle 38 includes a plurality of vertically spaced vanes 39. Each vane 39 comprises segments in respective channels fixed to each other on a common axis extending horizontally through openings in partition 13 and rotatably supported at its ends in vibration insulators 41 fixed to tank sidewalls 12a and 12b. The profile of each vane 39 is streamlined to minimize drag and both the leading and trailing edges are preferably acute to minimize boundary layer separation and turbulence.

The distance between adjacent screens is determined according to the average linear velocity of liquid $L_m$ and the average rising velocity of escaping air bubbles. In other words, the distance is set so that the average time for the liquid $L_m$ to travel between the adjacent screens 38 is approximately equal to the average time for all the air bubbles between the baffles to rise to the top of liquid $L_m$. The spacing between individual vanes 39 is determined according to the liquid loading rate and may vary approximately between a few centimeters for small flow rates and 30 centimeters for very large flow rates.

The vertical angle of each deflector vane 39 in each screen 38 is adjustable by gang-operated levers 40 according the height and flowrate of liquid $L_m$. The angle may vary approximately between a few degrees for very shallow tanks and 60 degrees for very deep tanks. Levers 40 may also be adjusted automatically to increase and decrease directly with changes in the flowrate of liquid $L_m$.

Figure 4:
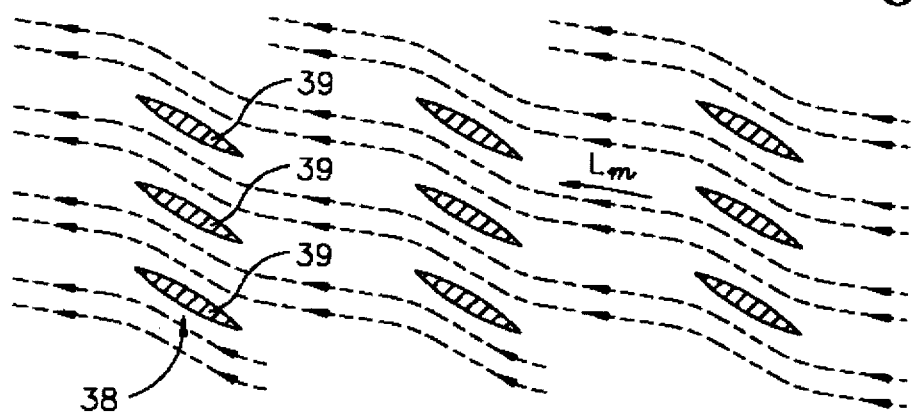
FIG. 4 is an elevation view of typical near-laminar flowpaths produced in the flotation tank of FIG. 1.

As shown in FIG. 4, mixed liquid $L_m$ is unified and deflected slightly upward as it flows through the screens 38 thereby quickly reducing the extensity and intensity of turbulence and shockwaves near the mixing chamber 18 to produce more uniform and near-laminar flow. The main functions of deflector baffles 38 are to resist shock loadings of liquid and dump liquid turbulences, to prevent backmixing, to direct the flow toward the surface, to unify the axial flow, and prevent various non-ideal flows and bring the flow closer to vertically uniform laminar flow or so-called plug-like flow. Therefore, the more turbulent the incoming liquid is, the more sets of the deflector baffles are needed to produce the above effect.

Figure 5:
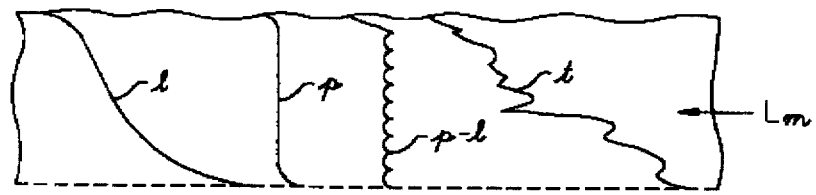
FIG. 5 is a velocity profile through a vertical section of a flowpath.

Strictly speaking, the uniformity of the laminar flows produced should increase as the number of deflector vanes per set increases also. Since the mixing chamber is designed and placed in such a way as to produce horizontally even (uniform) flows, the extensity and intensity of the turbulence of the incoming liquid may be relatively even in the horizontal direction. But, in the vertical direction, the turbulence of the incoming liquid is both intensive and extensive. The deflector baffles 38 reduce the turbulence. Important design parameters are the initial liquid turbulence, Reynolds number, design of the deflector baffles, the number of baffles in the flow path, and the number of partitions 13 needed for reducing the Reynolds number, Re. Re is reduced when the liquid flows through the space between vanes 39. Over a horizontal surface, as illustrated in FIG. 5, the net result of these functions is plug-like flow conditions having a velocity profile p-1 as compared to the velocity profiles for ideal plug flow p, laminar flow 1 and turbulent flow t. Essentially, plug-like flow profile p-1 comprises a plurality of small laminar flow profile between each of adjacent deflector vanes 39.

Dissolved air in liquid $L_2$ is also introduced evenly into mixed liquid $L_m$ downstream of each deflector baffle 38 near the bottom of tank 12 through spaced apart nozzles in a distribution conduit 43 extending across the flowpath. In a small capacity tank, only one or two deflector baffles 38 and distribution conduits 43 may be needed to prevent backmixing, but more baffles and conduits may be required as the tank length and liquid loading rate increase.

The discharge end of tank 12 includes a baffle 42 extending between sides 12a and 12b with an opening 42a across the bottom for most of the clarified liquid $L_3$ to discharge through an outlet port 44 to an overflow box 48. An adjustable weir 46 in box 48 maintains the level of liquid $L_m$ at a predetermined height. Other means for controlling the liquid level are contemplated such as a liquid level sensor regulating the rate of untreated liquid $L_1$ at input port 18.

Many microbubbles of air, released from the distribution conduits 43 evenly supplied throughout tank 12, will attach and completely surround particles in suspension to form segregated floc-bubble agglomerates. The agglomerates float to the surface of liquid $L_m$ to form a bed of sludge S. The agglomerates are not easily wetted because they are surrounded by the microbubbles, and will stay dry as they float to the surface and attach to the bottom side of the sludge bed. These conditions assure a high clarification efficiency and high content of sludge solids. As the agglomerates contact the bottom side of the sludge bed, the air bubbles are released from the agglomerates and accumulate as a blanket of air A separating the bottom of sludge S from the surface of liquid $L_m$. The air blanket helps to prevent sludge S from breaking up and remixing with the liquid. The concentration of agglomerates directly under air blanket A is relatively high due to the flotation action of the rising air bubbles. By maintaining a thick bed of sludge S and separating it from the liquid surface by air blanket A, the top layer of sludge S can be easily skimmed off without disturbing the whole sludge bed.

The sludge S is slowly compressed under its own weight against the opposing buoyancy force applied by the blanket of air A. The sludge S becomes drier near the top as water drips slowly downward under compression or evaporates.

While the sludge bed stays afloat on the air blanket A, the top layer is skimmed off by a continuous chain of skimmer blades 50 driven by motor-drive sprockets 52 at either end of tank 12 preferably in the opposite direction to the flow of liquid $L_m$. The speed of sprockets 52 is regulated by a motor speed controller 53. The top layer of sludge S travels over a weir plate 54 and discharges into a trough or hopper 56 across the width of end wall 12c. Blades 50 are preferably constructed of Teflon, or rubber supported between stainless steel plates, the depth of penetration into sludge S being adjustable such as by changing the elevation of sprockets 52 by a rack and pinion mechanism 55 or the height of the liquid level. The removal rate sludge S can be controlled by adjusting the liquid height, blade speed and penetration depth, to match the flotation rate. Thus, the residence time of sludge S in the tank is controlled so that the solids content of the removed sludge is also controlled. Upper sections of end walls 12c and 12d may be sloped inwardly over sprockets 52 for an operator's protection. Float sludges produced by this DAF system have solid contents between 50% and 85%, compared to less than 10% in DAF systems of the prior art.

The DAF system according to the invention is also applicable to operations involving gas-liquid contacting or chemical reactions. In such a system the top of flotation tank 12 is covered in order to recover and discharge, or recycle, any vapors or gases given off. Typical industrial applications include, but not limited to, disinfecting water with a biocide, such as chlorine, chlorine dioxide, or a non-oxidizing biocide; oxidating waste water with ozone, oxygen, oxygen-rich air; striping or desorption of dissolved gases and dissolved volatile organic matter from water or other liquids; scrubbing of air containing solid particles and/or water-soluble gases such as ammonia, hydrogen sulfide, carbon oxide, carbon monoxide, etc.; and separation of gas mixtures by absorption with water or other liquid.

It is important to point out that the rate of mass transfer between a gas phase and a liquid phase in gas-liquid contacting operations and in gas-liquid reactions can be increased many times if dissolved gas is used. This holds true regardless of the direction of mass transfer, i.e. from gas-to-liquid or from liquid-to-gas. In the case of chemical or biological gas-liquid reactions, the activities of dissolved gas reactants are usually the driving force in the reactions; therefore, the use of dissolved gas reactants can increase the reaction rates greatly. This fact is well-known for gas-liquid chemical reactions, but not for biological reactions. Experiments have shown that the use of dissolved air in biotreatments of waste water can increase the rate of the bio-reaction hundredfolds. Accordingly, it is extremely advantageous to use a DAF system to carry out gas-liquid mass transfers or gas-liquid reaction, both chemical and biological. To increase the treatment capacity of the flotation tank as a bioreactor, deflector baffles 38 may also serve as a convenient attachment for the growth of microorganisms needed for biotreatments.

When applied to an aerobic or anaerobic biotreatment process, part of the suspended solids, consisting of mostly microorganisms, accumulated under the air blanket A, is continuously recycled to inlet port 18 through a recirculation pipe 58, the rate of recirculation being controlled by valve 60. The kinetic energy for recirculation is generated by untreated liquid $L_1$ passing through an orifice 14. Alternatively, a recycling pump (not shown) may provide the recirculation through pipe 58. The recycling rate determines the extent of bioreaction and rate at which final inactive sludge and gas product are produced. Of course, a part of sludge S discharged at trough 56 can be recycled by means not shown directly into tank 12 or through the inlet port 18. The gases formed are discharged from tank 12 in the same way as for a gas-liquid contacting process.

The apparatus provided by the invention can be located and operated indoor, or outdoor with a protective cover. By comparison with a conventional rectangular DAF apparatus, its length is shorter for large liquid loadings. Therefore, it occupies less space and can be installed on a site having very limited area.

The near-laminar flow of liquid through tank 12 produces a hydraulic flocculation effect on the particles, thus requiring less coagulating agents and flocculating agents in pretreatment of raw waste liquids. The plug-like flow under uniform near-laminar flow conditions enables faster separation with higher efficiencies.

Most of the existing rectangular DAF system can be readily retrofitted at low cost with deflector baffles 38 and the dissolved air distributors 43 and achieve the desired effects.

The apparatus as disclosed can also be used for simultaneously carrying out various processes and operations with high rates of efficiency, such as clarification, thickening and dewatering of sludge, gas-liquid contacting, mass transfers and chemical or biological gas-liquid reactions.

It will be understood that various changes in the details and arrangement of parts, which have been herein described and illustrated in order to explain the principles of the invention, can be made by those skilled in the art within the principles and scope of the invention as defined in the applied claim.

I claim:

1. In an improved dissolved air flotation system for removing suspended matter contained in a first liquid, the system including a rectangular tank forming a continuous flowpath between opposed ends, an inlet port at one of the ends for receiving a liquid mixture of the first liquid and a second liquid containing dissolved air, a first outlet port at the other of the ends for discharging any of the liquid mixture separated from the suspended matter, and a second outlet port at either of the ends for discharging the suspended matter in the liquid mixture floated to the surface by microbubbles of air released along the flowpath, the improvement comprising:

baffle means including a plurality of vanes defining inclined surfaces disposed within the flowpath for redirecting the liquid mixture upwardly and forwardly in a continuous stream of plug-like flow without back-mixing, each vane being substantially shorter than the length of the tank.

2. The improvement according to claim 1 wherein:

said baffle means includes a vertical array of streamline vanes spaced apart on horizontal axes across the flowpath.

3. The improvement according to claim 2 further comprising:

adjusting means for jointly regulating the angular position of said vanes about the axes in the flowpath according to the liquid level and flow rate of the mixture.

4. The improvement according to claim 2 wherein:

each of said vanes is relatively thin in cross section and has acute leading and trailing edges.

5. The improvement according to claim 1 further comprising:

distributor means extending across the flowpath near the bottom of the tank and downstream of the said baffle means for introducing in the liquid mixture a supplemental amount of the second liquid.

6. The improvement according to claim 5 wherein:

said distributor means includes a conduit with a plurality of apertures spaced along the length thereof.

7. The improvement according to claim 1 further comprising:

regulating means for adjusting the liquid level of the mixture and the residence time of floated matter for spatially supporting the floated matter above the surface of the liquid mixture in the tank by a blanket of the released air.

8. The improvement according to claim 7 wherein:

said regulating means includes a weir connected to said first outlet port for controlling the liquid output from said tank, and an extractor controller for regulating the amount of floated matter removed from the tank.

9. The improvement according to claim 8 wherein:

said liquid level controller includes an adjustable weir connected to said outlet port for regulating the liquid output therefrom.

10. The improvement according to claim 8 wherein:

said extractor controller includes a plate connected to said second outlet port for preventing a bottom layer of the floated matter from discharging, and motor-driven chain of blades for skimming off a top layer of the floated matter at one of the ends of the tank, the elevation of said chain being adjustable.

11. The improvement according to claim 10 wherein:

said extractor controller further includes a blade speed regulator for maintaining a preselected rate of removal a top layer of the floated matter.

12. The improvement according to claim 1 wherein:

said baffle means includes a plurality of vertical arrays of streamline vanes positioned at spaced intervals along the flowpath.

13. The improvement according to claim 12 wherein:

said vanes in each of said arrays are vertically spaced apart on horizontal axes thereof.

14. The improvement according to claim 13 further comprising:

adjusting means for jointly regulating the vertical angular position of said vanes about the axes in the flowpath according to the liquid level and flow rate of the mixture.

15. The improvement according to claim 13 wherein:

each of said vanes is relatively thin in cross section and has acute leading and trailing edges.

16. An improved dissolved air flotation tank for removing suspended matter contained in a first liquid, comprising:

a rectangular vessel forming a lengthwise flowpath between opposed ends;

an inlet port at one of the ends for receiving a liquid mixture of the first liquid and a second liquid containing dissolved air;

a first outlet port at the other of the ends for discharging any of the liquid mixture separated from the suspended matter;

a second outlet port at either of the ends of the tank for discharging the suspended matter in the liquid mixture floated to the surface by microbubbles of air released along the flowpath;

at least one vertical array of streamline vanes disposed on horizontal axes across the flowpath between opposite sides of the tank, each of said vanes having an inclined surface in the flowpath substantially shorter than the length of said vessel for redirecting the mixture upwardly and forwardly in a continuous plug-like flow without back-mixing.

17. A flotation tank according to claim 16 wherein:

said vanes are angularly positioned about the axes.

18. A flotation tank according to claim 17 further comprising:

adjusting means for jointly regulating the angular position of said vanes with respect to the flowpath.

19. A flotation tank according to claim 17 wherein:

each of said vanes is relatively thin in cross section and has acute leading and trailing edges.

20. A flotation tank according to claim 16 further comprising:

distributor means extending across the flowpath near the bottom of the tank and downstream of each of the said at least one vertical array of vanes for introducing supplemental amount of the second liquid into the liquid mixture.

21. A flotation tank according to claim 20 wherein:

said distributor means includes a conduit with a plurality of apertures spaced along the length thereof.

22. A flotation tank according to claim 16 further comprising:

regulating means for adjusting the liquid level of the mixture and residence time of the floated matter for spatially supporting the floated matter above the surface of the liquid mixture in the tank by a blanket of the released air.

23. A flotation tank according to claim 22 wherein:

said regulating means includes a weir connected to said first outlet port for controlling the liquid output from said tank, and an extractor for regulating the amount of floated matter removed from the tank.

24. A flotation tank according to claim 23 wherein:

said liquid level controller includes an adjustable weir connected to said outlet port for regulating the liquid output therefrom.

25. A flotation tank according to claim 23 wherein:

said extractor includes a trough disposed across the one end of the tank above the liquid level, and a motor-driven chain of blades for discharging a top portion of the floated matter into said trough, the elevation of said chain being adjustable.

26. A flotation tank according to claim 25 wherein:

said extractor further includes a blade speed regulator for maintaining a preselected rate of removal of the floated matter.

27. A flotation tank according to claim 26 further comprising:

plate means mounted in said trough for limiting the floated matter discharged to the top portion thereof.

28. A dissolved air flotation system for separating suspended matter from a liquid, comprising, in combination:

a rectangular tank forming a flowpath between opposed ends with an inlet means at one of the ends;

a mixing chamber at the one end communicating with said inlet means for introducing a mixture of untreated liquid containing suspended matter with treated liquid containing dissolved air into the flowpath along the length of said tank;

baffle means including a plurality of vanes defining inclined surfaces disposed within the flowpath for redirecting the liquid mixture upwardly and forwardly in a continuous stream of plug-like flow without back-mixing, each vane being substantially shorter than the length of the tank;

skimming means disposed in an upper section of the tank for removing a top layer of the suspended matter carried to the surface by microbubbles of air released from the mixture and adhered to the suspended matter;

an outlet port of the other of the ends for discharging treated liquid separated from the matter floated to the surface along the flowpath;

means for dissolving air in a portion of the treated liquid; and recycling means connected to said inlet port means for recycling said portion to said mixing chamber.

* * * * *